United States Patent [19]

Marks

[11] 3,838,925
[45] Oct. 1, 1974

[54] PHOTOELECTRIC OPACITY MEASURING SYSTEM

[75] Inventor: William S. Marks, Little Rock, Ark.

[73] Assignee: Baldwin Electronics, Inc., Little Rock, Ark.

[22] Filed: Dec. 7, 1972

[21] Appl. No.: 311,718

[52] U.S. Cl.............. 356/207, 250/573, 250/575, 356/206
[51] Int. Cl. .......................................... G01n 21/26
[58] Field of Search.................. 250/218, 573–576; 356/180, 181, 201, 206, 207; 350/63

[56] References Cited
UNITED STATES PATENTS

| | | | |
|---|---|---|---|
| 2,118,716 | 5/1938 | Wager | 350/63 UX |
| 3,453,049 | 7/1969 | Wager | 350/63 X |
| 3,526,772 | 9/1970 | Troll | 356/180 X |
| 3,557,376 | 1/1971 | Senyk | 250/218 |
| 3,562,535 | 2/1971 | Leger et al. | 250/218 |
| 3,572,946 | 3/1971 | Little | 356/181 |
| 3,690,774 | 9/1972 | Kottle et al. | 356/206 |

*Primary Examiner*—Ronald L. Wibert
*Assistant Examiner*—F. L. Evans
*Attorney, Agent, or Firm*—Hyman Hurvitz

[57] ABSTRACT

An opacity measuring system for measuring opacity of smoke in a smoke stack or other effluent conveying pipe, in which light is transmitted from a light source chamber through the smoke or effluent to a chamber containing a photo-electric sensing device, separate moving Mylar tape windows being continuously moved past ports of the light and sensing chambers to provide continuous isolation of these chambers from the smoke or effluent via an always clean window into and out of the stack, thereby to prevent contaminations which would introduce errors in measuring opacity. Light is directed via two paths from one common light source in one chamber to two adjacent photo-cells in another chamber, one path extending through the smoke or effluent and the other via a fiber optic light pipe exclusive of the smoke or effluent, and the outputs of the two photo-cells are compared in a differential amplifier to provide an accurate measurement of opacity compensated for variations in the intensity of the source, the amplifier being powered by a regulated voltage supply, as is also the light source, to maintain accuracy of measurement despite normal line voltage variations.

11 Claims, 7 Drawing Figures

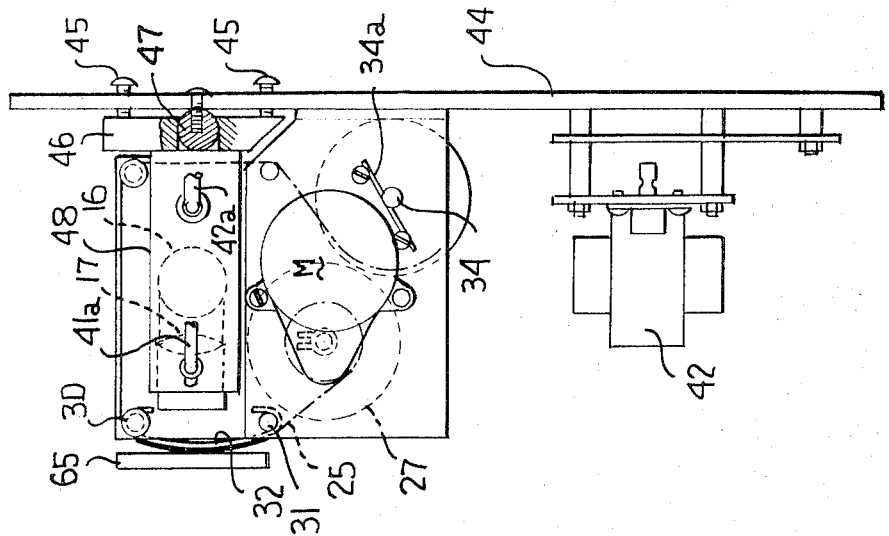
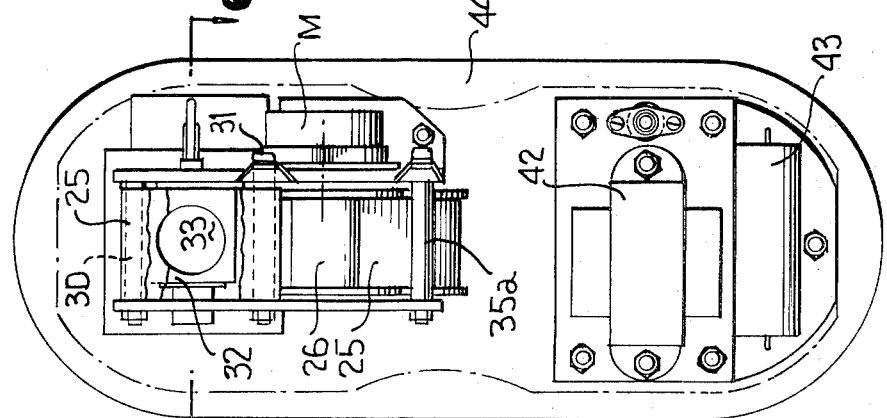
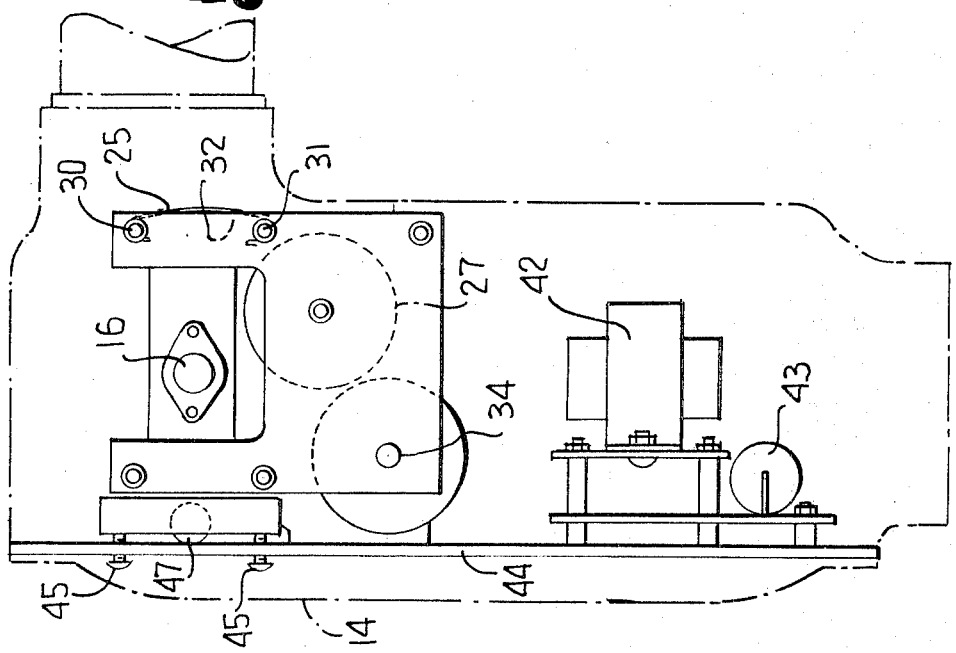

PHOTOELECTRIC OPACITY MEASURING SYSTEM

BACKGROUND

It is the objective of the present invention to provide a pair of demountable chambers, the chambers containing, one a collimated light source and the other a photoelectric light sensing device. The chambers can be secured to separated locations of a smoke stack, for example, and each is provided with its own moving Mylar window to isolate its chamber from the smoke in the stack, providing an always clean window. Each chamber is integrated in the sense that each is completely operative independently of the other, when connected to an ac line. Each has provision for static smoke purging, employed to purge static smoke from the optical paths, as an optional feature where required. Both chambers, the light source chamber and the light sensing chamber, are complete in that they each include a clock or step motor for moving its Mylar tape window, the light sensing unit including a differential amplifier responsive to its pair of photocells, and each unit including its own regulated power supply. The differential amplifier can feed a meter or a chart recorder, as is usual.

SUMMARY

An opacity meter including a light source chamber and a light sensing chamber, mounted to straddle a smoke stack containing effluent gases, each chamber including a moving Mylar tape window which isolates the interiors of the chambers from the smoke in the stack, provision being made to purge the inactive volume of the sample pipe of static smoke, and each unit being operatively complete in itself and replaceable in the system.

DRAWINGS

FIG. 2 is a view in perspective of a demountable reel for a Mylar window, employed in the system of FIGS. 1 and 1a;

FIG. 3 is a front elevation of a light source unit according to the invention;

FIG. 4 is a view in side elevation corresponding with FIG. 3;

FIG. 5 is a view in left side elevation corresponding with FIG. 3; and

DETAILED DESCRIPTION

Figure 1:
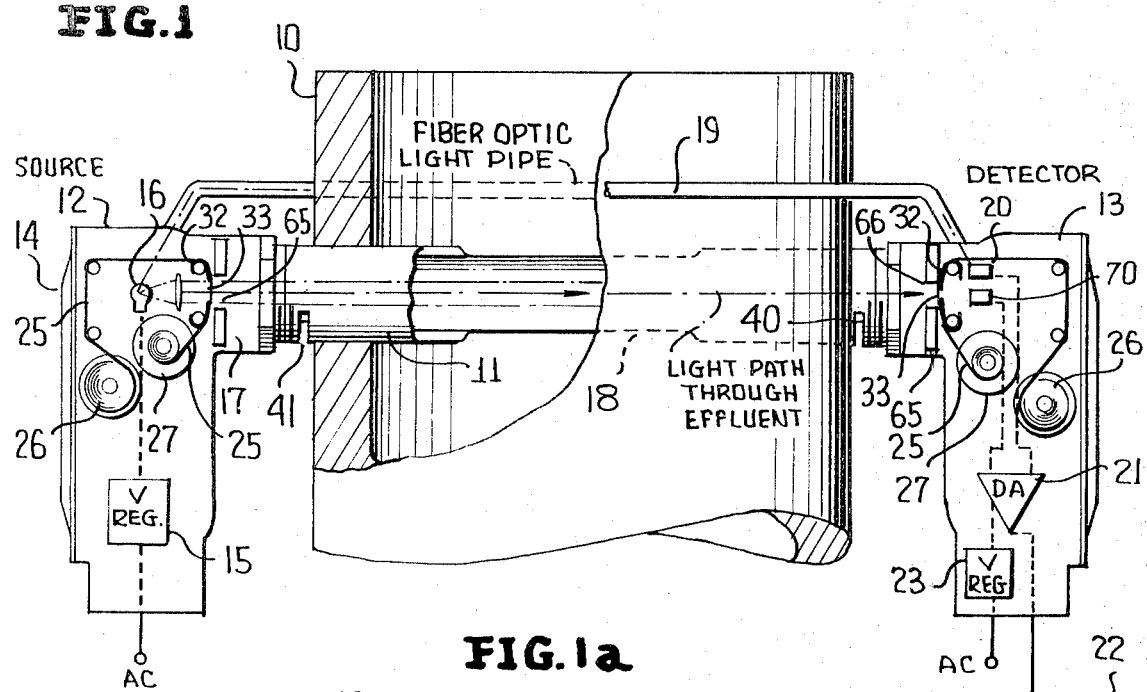
FIG. 1 is a view in side elevation of a system according to the invention, shown mounted on a smoke stack.

In FIG. 1 of the accompanying drawings, 10 is a cross-sectional view, partly broken away, of a smoke stack or other effluent conductor. Extending through the effluent conductor 10 is sampling pipe 11, threaded at each end and containing slots 18 through which effluent may flow into and out of the sampling pipe 11. These slots are referred to as sampling slots. The sampling pipe 11 extends wholly through the smoke stack 10 and is threaded at each end, to enable threaded mounting of a light source chamber 12 on one end of the pipe and of a light detector chamber 13 on the other end. The light source chamber 12 includes a cover plate 14 for easy access, and contains internally a voltage regulated power supply 15, powered by commercial ac current, the power supply 15 energizing an incandescent lamp 16, which transmits light, via a collimating lens 17, as a beam proceeding through the pipe 11, where the light beam is attenuated by the effluent and impinges on a first photo-cell 70 contained in chamber 13. Light is also transmitted directly from lamp 16 via a fiber optic light pipe 19 extending externally of smoke stack 10 to a second photo-cell 20. Light in the light pipe 19 is not subject to attenuation by the effluent and serves for comparison of light attenuated by the effluent and light not so attenuated.

The photo-cells 70 and 20 provide signal to a differential amplifier 21, the output of which drives a chart recorder 22, and the differential amplifier 21 is provided with a voltage regulated power supply 23. Utilization of voltage regulated power supplies 15 and 23 assures that variations of ac voltage will not affect chart readings. Utilization of two paths, one via the effluent and one independent of the effluent, assures that aging of lamp 16, or its replacement, with consequent variation of light output, will have no effect on chart readings.

Figure 2:
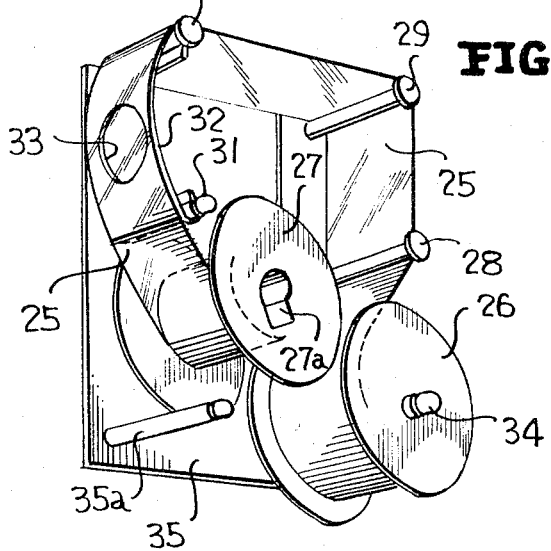

Each of the chambers 12 and 13 is waterproof, for out-of-doors application and each is isolated from the effluent by a moving Mylar tape window. In FIGS. 1 and 2, 25 is a thin Mylar tape which extends from supply spool 26 to take-up spool 27, passing over guides 28, 29, 30 and also over guide spring 32, the latter having a central circular aperture 33 which permits egress and ingress of light to the interiors of the chambers. The guides 28, 29, 30 are secured to a common mounting plate 35, which also supports supply spool 26, via pin 34, and take-up spool 27. The latter includes a keyway 27a for coupling to a clock or step motor driver.

FIGS. 3 – 5 illustrate the reel 26 and its drive motor M, which may be a clock motor or a step motor, and the Mylar tape 25, broken away in FIG. 3. The voltage regulated power supply including its transformer 42, and filter capacitor 43 are illustrated as mounted on the same panel 44 as are optical elements and Mylar drive and guidance elements.

The plate 35 is demountable as a unit, being supported by three clip pins 31, 34, 35a, which are spring held as by spring 34a (FIG. 5), when the plate is mounted, similar springs being provided for pins 35a and 31, so that the plate 35 and the spools 27, 34 and the Mylar tape 25, and the pins 28, 29, 30 can be inserted or removed as a unit, to facilitate manual removal of an old tape and replacement by a new tape, without requiring removal of bolts or the use of tools.

The optical elements of the system are secured, primarily lens 17 and lamp 16, in the case of the light source chamber 12, to panel 44 by screws 45, the settings of which serve to pivot the mounting panel 46, centrally pivoted on a ball 47, and thereby to steer the light beam provided via chamber 12 to its photo-cell 70. From the mounting panel 44, extends an L-shaped bracket 48, to which the light source 16 and lens 17 are secured, these latter being mounted in a hollow metallic enclosure 49.

The detector unit 13 is not illustrated in detail nor described in detail, since the same structural features apply to both the light source unit 12 and the detector unit 13, there being involved the substitution of photocells and a differential amplifier for the lens and light source of FIGS. 3 – 6, inclusive.

Figure 1A:
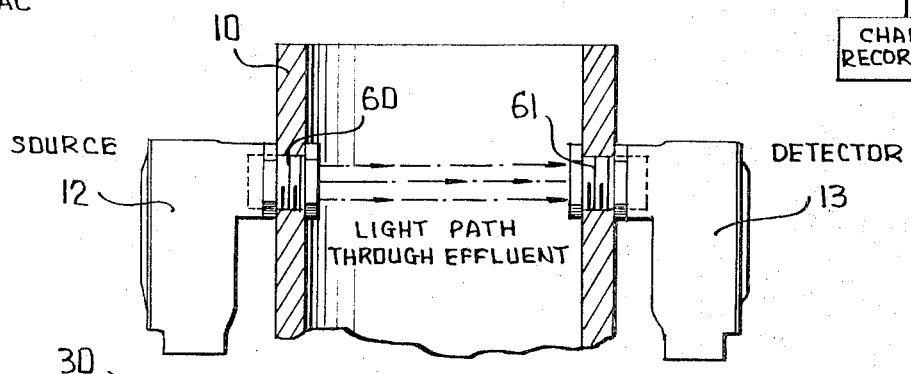
FIG. 1a is a view in side elevation of a modification of the system of FIG. 1.

In order to provide isolation of the chambers 12 and 13 from the sampling pipe 11, in the case of FIG. 1, and from the stack 10 in the case of FIG. 1a, there is provided a seal 65, in the form of a compressible washer, which has a Mylar coated interior surface, the latter surface bearing against the Mylar tape 25 at opening 33 to reduce friction. No smoke can therefore leak into the chambers, under normal conditions. The central openings 66 in washer 65 permits egress and ingress of light but also seals around the edge of opening 30, so that the washer 65 together with the moving Mylar tape 25 which covers opening 33 provides a solid smoke impermeable wall, at least where stack 10 is not under considerable pressure.

Figure 6:
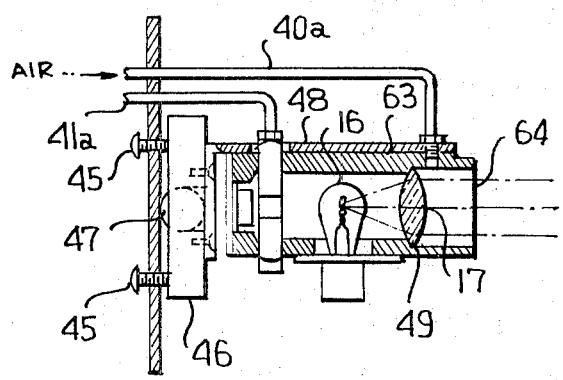
FIG. 6 is a view in section of a modification of the system of FIG. 1.

Lamp 16 and lens 17 are secured internally in an enclosure 63 within chamber 12 which is not illustrated in FIG. 1, but is illustrated in detail in FIG. 6. Enclosure 63 has an open end 64, before which the Mylar tape 25 moves. A similar construction is provided in chamber 13, to isolate the photo-cells.

The general organization of the system may follow that shown in FIG. 1 or a parallel organization, shown in FIG. 1a, the sole distinction between the two systems being, that in FIG. 1 a sampling pipe 11 is employed, which is omitted in FIG. 1a. In the latter case the chambers 12, 13 are directly secured to the effluent conductor 10, via threaded nipples, as 60, 61. In FIG. 1, the lamp 16 and the collimating lens 17 are locked internally of the loop provided by the Mylar tape 25 and the guide plate 32 with its window 33. The lamp 16 and its collimating lens 17 are adjustable in respect to orientation so as to provide a light beam which passes centrally down the sampling pipe 11 to photo-cell 70, which senses the intensity of the light beam and provides a corresponding output signal to one side of differential amplifier 21 in chamber 13. Light is piped directly from lamp 16 to a second photo-cell 20 via a fiber optic light pipe, and the latter photo-cell provides an electrical signal corresponding with the intensity of the light output of lamp 16, unattenuated by passage through effluent. The latter signal is applied to the other side of differential amplifier 21, and the latter provides an amplified difference signal to drive chart recorder 22. As the intensity of luminous output provided by lamp 16 varies, due to aging of the lamp, for example, corresponding differences of output signal occur at photo-cells 70 and 20, so that the difference between the two signals remains essentially that due to the effect of the effluent alone.

The light source comprising lamp 16 and the collimating lens 17, in the case of chamber 12, and the photo-cells 90 and 20 in the case of chamber 13, are shielded from direct exposure to effluent by the moving Mylar windows 25, the Mylar moving with sufficient speed to expose at all times a clean window.

41 and 40 in FIG. 1 are transverse slots in the underside of the sampling pipe, outside of the stack. Draft in the stack pulls in outside air through slots 41 and 40 purging static smoke from the inactive portion of the sampling pipe and also providing an air curtain which thermally isolates the instrument heads from the hot effluent gas in the stack. As can be seen this operation would not function in a positive pressure stack. In the alternate case the slots 41 and 40 would be replaced with fittings 41a and 40a (FIG. 6) to allow connection of compressed gas lines to perform either continuous or intermittent purging, and to provide said thermal isolation. The instrument housings would also be pressurized up to the stack pressure to prevent leakage of smoke into the units.

What is claimed is:

1. A monitor for hot effluent flowing in a conduit, comprising a first chamber containing a source of light, a second chamber containing a first photo-cell, a second photo-cell contained in said second chamber, tubular means for mounting said chambers in opposed relation in opposed apertures in said conduit, said apertures extending through said conduit to provide access to said effluent, a first take up roll and a first supply roll located in said first chamber, a first drive motor detachably keyed to said first take up roll, a second take up roll and a second supply roll located in said second chamber, a second drive motor detachably keyed to said second take up roll, transparent sheet material provided on said supply rolls to be taken up by said take up rolls, respectively, guide rolls guiding said transparent sheet material in paths adjacent said source and said photo-cells, respectively, said paths extending between said apertures and said source and photo-cells, respectively, washer means having openings bearing against said transparent sheets and having outer diameters filling said tubular means, said washer means located such that said source and photo-cells are isolated by said sheets from said effluent during movement of said sheets while enabling transfer of light from said source to said first photo-cell, means for collimating the light from said source into a narrow beam passing through said effluent and falling on only said first of said photo-cells to the exclusion of the second of said photo-cells, and means for applying to the other of said photo-cells light piped directly from said source and by-passing said effluent.

2. An opacity measuring system for measuring opacity of effluent in a stack, comprising a first chamber secured on one side of said stack, a second chamber on the other side of said stack, said chambers having openings into said stack which are co-linear and opposed, so that light may pass from said first chamber through effluent in said stack into said second chamber, said first chamber including a source of a beam of light directed into said second chamber via said effluent, said second chamber including photo-cell means for detecting the intensity of said beam of light as attenuated by said effluent, said first chamber including a first moving transparent tape through which said light beam emerges from said first chamber, and a first stationary sealing washer bearing against said first moving transparent tape and with said moving transparent tape being arranged as a complete seal to prevent ingress of said effluent into said first chamber but having an opening to enable egress of said light beam, said first sealing washer being located between said moving tape and said stack, said second chamber including a second moving transparent tape through which said light beam proceeds into said second chamber, and a second sealing washer bearing against said second transparent tape and with said second transparent tape being arranged as a complete seal to prevent ingress of said effluent into said second chamber but having an opening to enable ingress of said light beam via said opening and said second moving transparent tape, said second stationary sealing washer being between said moving tape and said stack.

3. The combination according to claim 2, wherein is provided means for injecting air under pressure into said chambers to form an air pressure barrier against ingress of said effluent past said seals and said tapes.

4. The combination according to claim 3, wherein is provided means for removing said air under pressure to concurrently remove static effluent from the light paths in said chambers.

5. The combination according to claim 2, wherein is provided means responsive to draft in said stack for flowing air through said chambers to purge static effluent from said chambers and for providing an air curtain to thermally isolate said chambers from said stack.

6. A monitor for hot moving effluent in a conduit, comprising a first discrete chamber containing a source of collimated light, a second discrete chamber containing a photoresistor detector unit, separate moving isolating transparent windows located internally of each of said chambers, respectively, for providing separate transparent continuously replaced effluent isolating windows arranged to permit light to pass from said source to said photo-resistor detector unit while preventing ingress of said effluent to said source and to said photoresistor detector unit, respectively, separate means for mounting each of said chambers on said conduit in opposed relation, said chambers including separate and independent motor means for moving said isolating windows with respect to said photo-resistor unit and with respect to said source, take up and supply rolls for said windows, means mounting said take up and supply reels detachably with respect to said motors and said chambers, and means protecting said chambers from static effluent tending to collect in portions of said chambers and concurrently to protect said windows and photo-resistor detector unit from the heat of said hot moving effluent.

7. A system for measuring the opacity of hot effluent in a conduit, comprising a source of a light beam, said source being located on one side of said conduit, a photo-cell detector responsive to said beam of light, said photo-cell detector being located on the other side of said conduit, a first enclosure for said source mounted on said conduit, a second enclosure for said photo-cell detector mounted on said conduit in opposed relation to said first enclosure, a first movable transparent plastic strip for isolating said first enclosure from the effluent in said conduit and separated physically from said conduit by a substantial distance, a second movable transparent plastic strip for isolating said second enclosure from the effluent in said conduit and separated physically from said conduit by a substantial distance, said strips being movable transversely of said light beam, each of said enclosures and said conduit including conjoined openings, respectively, for permitting transfer of said light beam from said source to said photo-cell detector, said conjoined openings tending to admit static effluent, said plastic strips finding the temperature of said hot effluent unbearable, and means for causing flow of air from externally of said conduit through the spaces located between said conduit and said plastic strips to remove said static effluent and to maintain said plastic strips as relatively low temperatures below the temperatures of said effluent and of said conduit and at bearable temperature for said plastic strips, the entire light path between said plastic strips being free of physical obstacles to flow of said effluent.

8. A system for measuring the opacity of hot effluent in a conduit, said conduit having two opposed and aligned mounting openings in its wall, a source of a collimated light beam, a first enclosure for said source, means for mounting said first enclosure in one of said openings and directing said light beam toward the other of said openings, a photo-cell detector unit, a second enclosure for said photo-cell detector unit, means for mounting said photo-cell detector unit in the other of said openings in such orientation as to intercept said light beam, means located internally of said first enclosure for isolating said source from said effluent while enabling transfer of said light beam through said effluent to said photo-cell detector, said last means including a first moving strip of transparent material, means located internally of said second enclosure for isolating said photo-cell detector unit from said effluent while enabling passage of said beam of light to said photo-cell detector unit, said last means including a second moving strip of transparent material, said transparent material being destructible by the heat of said hot effluent, and means for isolating said transparent material from the heat of said hot effluent and concurrently removing static effluent from the vicinity of said transparent material, comprising means for flushing gas at ambient temperature through said enclosures in spaces located between said transparent material and said conduit, the entire light beam path between said strips being free of obstacles.

9. The combination according to claim 8, wherein is included sampling pipes extending well into said conduit, means mounting said enclosures on said sampling pipes, and means for flushing said gas through said sampling pipes to said conduit.

10. The combination according to claim 9, wherein said conduit contains effluent at pressure below external ambient pressure, and wherein an opening is provided in said enclosure externally of said conduit for admitting air.

11. The combination according to claim 8, wherein the pressure of said effluent in said conduit is above the pressure externally of said conduit, and wherein said flushing gas is provided under pressure sufficient to overcome the pressure of said effluent.

* * * * *